(12) United States Patent
Chen et al.

(10) Patent No.: US 10,885,334 B2
(45) Date of Patent: Jan. 5, 2021

(54) METHOD AND SYSTEM FOR DETECTING OBJECT(S) ADJACENT TO VEHICLE

(71) Applicant: Hua-chuang Automobile Information Technical Center Co., Ltd., New Taipei (TW)

(72) Inventors: Yen-Lin Chen, New Taipei (TW); Chung-Yuan Chang, New Taipei (TW); Kuan-Kai Liao, New Taipei (TW); Chao-Wei Yu, New Taipei (TW); Ming Chen, New Taipei (TW)

(73) Assignee: HUA-CHUANG AUTOMOBILE INFORMATION TECHNICAL CENTER CO., LTD., New Taipei (TW)

( * ) Notice: Subject to any disclaimer, the term of this patent is extended or adjusted under 35 U.S.C. 154(b) by 104 days.

(21) Appl. No.: 16/206,149

(22) Filed: Nov. 30, 2018

(65) Prior Publication Data
US 2020/0175273 A1 Jun. 4, 2020

(51) Int. Cl.
*G06K 9/00* (2006.01)
*G06K 9/46* (2006.01)
(52) U.S. Cl.
CPC ..... *G06K 9/00671* (2013.01); *G06K 9/00362* (2013.01); *G06K 9/00825* (2013.01); *G06K 9/4642* (2013.01)
(58) Field of Classification Search
CPC .................................................. G06K 9/00671
See application file for complete search history.

(56) References Cited

U.S. PATENT DOCUMENTS

| 6,266,422 B1* | 7/2001 | Ikeda | G10L 21/0208 381/71.11 |
| 6,266,442 B1* | 7/2001 | Laumeyer | G06K 9/00818 382/104 |
| 2016/0292520 A1* | 10/2016 | Takahashi | G06K 9/6201 |
| 2019/0019045 A1* | 1/2019 | Ogura | G06K 9/00805 |
| 2019/0051030 A1* | 2/2019 | Choi | G06T 11/60 |

FOREIGN PATENT DOCUMENTS

| TW | 201319957 A | 5/2013 |
| TW | 201520907 A | 6/2015 |
| TW | 201824864 A | 7/2018 |

OTHER PUBLICATIONS

Wu (NPL "A Real-Time Embedded Blind Spot Safety Assistance System", International Journal of Vehicular Technology, vol. 2012, Article ID 506235, 15 pages, doi:10.1155/2012/506235, herafter referred to as Wu). (Year: 2012).*

* cited by examiner

*Primary Examiner* — Oneal R Mistry
(74) *Attorney, Agent, or Firm* — Muncy, Geissler, Olds & Lowe, P.C.

(57) ABSTRACT

A method for detecting one or more objects adjacent to a vehicle includes capturing a image of an object adjacent to the vehicle; determining a driving area in the image; cutting the driving area to form an identification window; selecting an identification area in the identification window; accessing a plurality of object image data in a memory to compare the plurality of object image data with the identification area; and identifying a specific object in the identification area by the processor.

8 Claims, 8 Drawing Sheets

|   |   |   |   |   |   |   |   |
|---|---|---|---|---|---|---|---|
| 2 | 3 | 4 | 4 | 3 | 4 | 2 | 2 |
| 5 | 11 | 17 | 13 | 7 | 9 | 3 | 4 |
| 11 | 21 | 23 | 27 | 22 | 17 | 4 | 6 |
| 23 | 99 | 165 | 135 | 85 | 32 | 27 | 2 |
| 91 | 155 | 133 | 136 | 144 | 152 | 57 | 28 |
| 98 | 196 | 76 | 38 | 26 | 60 | 170 | 51 |
| 165 | 222 | 60 | 27 | 77 | 85 | 43 | 136 |
| 71 | 13 | 34 | 23 | 108 | 27 | 48 | 110 |

FIG. 10(a)

|   |   |   |   |   |   |   |   |
|---|---|---|---|---|---|---|---|
| 80 | 36 | 5 | 10 | 0 | 64 | 90 | 73 |
| 37 | 9 | 9 | 179 | 78 | 27 | 169 | 166 |
| 87 | 136 | 173 | 39 | 102 | 163 | 152 | 176 |
| 76 | 13 | 1 | 168 | 159 | 22 | 125 | 143 |
| 120 | 70 | 14 | 150 | 145 | 144 | 145 | 143 |
| 58 | 86 | 119 | 98 | 100 | 101 | 133 | 113 |
| 30 | 65 | 157 | 75 | 78 | 165 | 145 | 124 |
| 11 | 170 | 91 | 4 | 110 | 17 | 133 | 110 |

FIG. 10(b)

METHOD AND SYSTEM FOR DETECTING OBJECT(S) ADJACENT TO VEHICLE

BACKGROUND

Technical Field

The instant disclosure relates to vehicle-driving categories, in particular, to method and system for detecting object(s) adjacent to a vehicle.

Related Art

Along with the developments in Advanced Driver Assistance Systems (ADAS) or autonomous driving, it is most important to identify the road condition as well as the surrounding condition of the vehicle to ensure the driving safety. Since dynamic objects, such as vendors, pedestrians, bicycles, and motorcycles may be at the surrounding cirumstance of the vehicle, if the object(s) is/are mistakenly identified, the vehicle may possibly fail to keep a safe distance from the object(s), thus causing damages.

In identification methods known to the inventor(s), such as several cameras capture images, and then the images are combined together for identification. However, performing the identification with the whole frame refers to a greater data volume and requires a longer processing time, so that the applicability of the identification methods known to the inventor(s) is not sufficient.

SUMMARY

In view of these, in one embodiment, a method for detecting one or more objects adjacent to a vehicle is provided. The method comprises capturing, by an image capturing device, an image of an object adjacent to the vehicle; determining, by a processor, a driving area in the image; cutting, by the processor, the driving area to form an identification window; selecting, by the processor, an identification area in the identification window; accessing, by the processor, a plurality of object image data in a memory to compare the plurality of object image data with the identification area; and identifying, by the processor, a specific object in the identification area in response to comparing the plurality of object image data with the identification area.

In one or some embodiments, the method further comprises generating, by the processor, an indication signal; transmitting, by the processor, the indication signal to a display; and displaying a picture corresponding to the specific object at a position corresponding to the identification area on the display.

In one or some embodiments, the method further comprises grayscaling, by the processor, the image or the identification window to obtain a grayscaled image or a grayscaled identification window. Furthermore, the method further comprises applying, by the processor, gamma correction to the grayscaled image or the grayscaled identification window to obtain a corrected grayscaled image or a corrected grayscaled identification window.

In one or some embodiments, the specific object is a dynamic object. Furthermore, in one or some embodiments, the method further comprises in respond to identifying, by the processor, the specific object is a two-wheeled vehicle, selecting, by the processor, an upper area of the identification area to perform a circle comparison on a head of a rider on the two-wheeled vehicle; and identifying, by the processor, whether the head of the rider on the two-wheeled vehicle wears a helmet.

In one or some embodiments, the method further comprises identifying, by the processor, the identification area with an image processing method using histogram of oriented gradients.

In one or some embodiments, a horizontal line of the image is a middle line of the driving area, and a height is extending upwardly and downwardly from the middle line along a direction perpendicular to the middle line.

In another embodiment, a system for detecting one or more objects adjacent to a vehicle is provided. The system is installed in the vehicle and comprises an image capturing device, a memory, and a processor. The image capturing device is configured to capture an image of an object adjacent to the vehicle. The memory is configured to store a plurality of object image data. The processor is electrically connected to the image capturing device and communicationally connected to the memory. The processor is configured to: determine a driving area in the image; cut the driving area to form an identification window; select an identification area in the identification window; access the plurality of object image data in the memory to compare the plurality of object image data with the identification area; and identify a specific object in the identification area.

In one or some embodiments, the system further comprises a display. The display is electrically connected to the processor. The processor is configured to output an indication signal in respond to the specific object identified. The display is configured to display a picture corresponding to the specific object at a position corresponding to the identification area in respond to receiving the indication signal.

Accordingly, by cutting the image as the identification window and selecting a portion for identifying, the speed of the identification by the processor can be accelerated. Hence, the specific object can be distinguished from other object in a fast manner, so that a fast and correct identification can be provided, thereby ensuring the driving safety.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The disclosure will become more fully understood from the detailed description given herein below for illustration only, and thus not limitative of the disclosure, wherein:

FIGS. 9, 10(a), 10(b), 11(a), and 11(b) illustrate schematic views showing the image processing method using histogram of oriented gradients.

DETAILED DESCRIPTION

Figure 1:
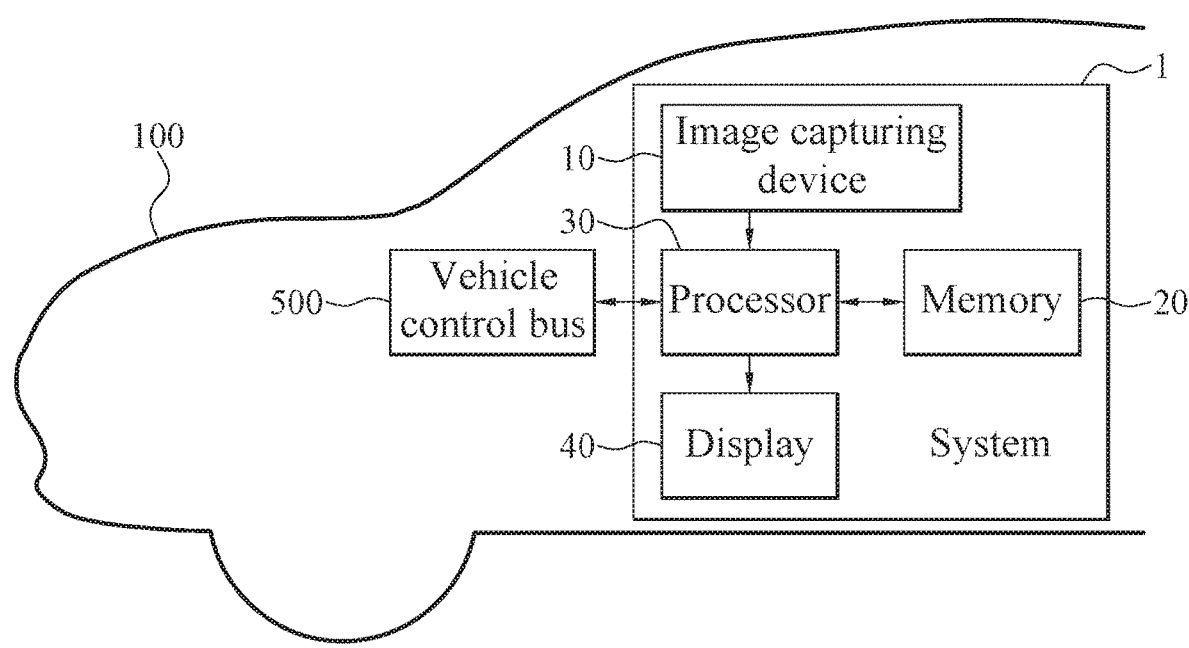
FIG. 1 illustrates a schematic view of a system for detecting object(s) adjacent to a vehicle according to an exemplary embodiment of the instant disclosure.
Figure 2:
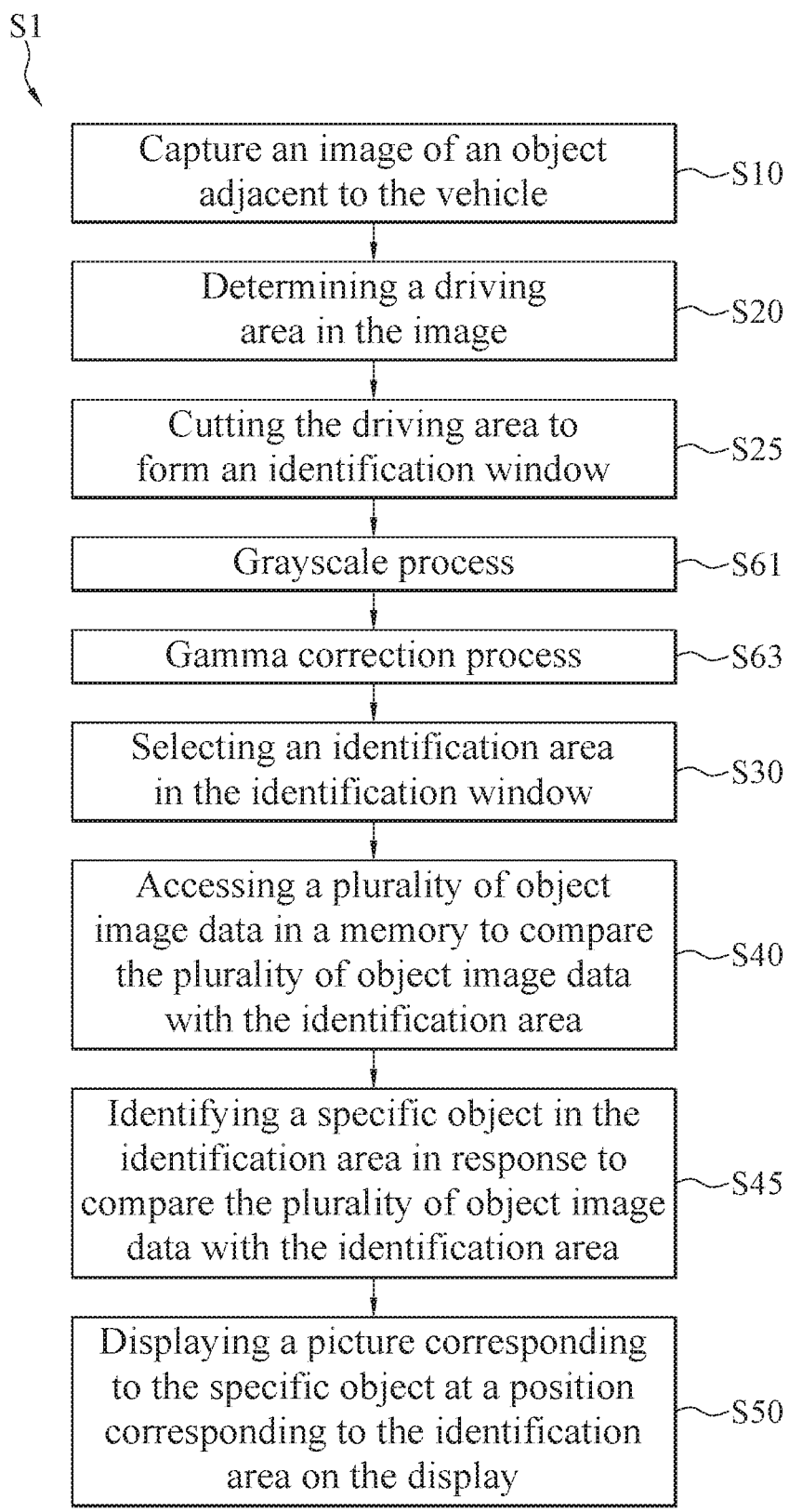
FIG. 2 illustrates a flowchart of a method for detecting object(s) adjacent to a vehicle according to an exemplary embodiment of the instant disclosure.
Figure 3:
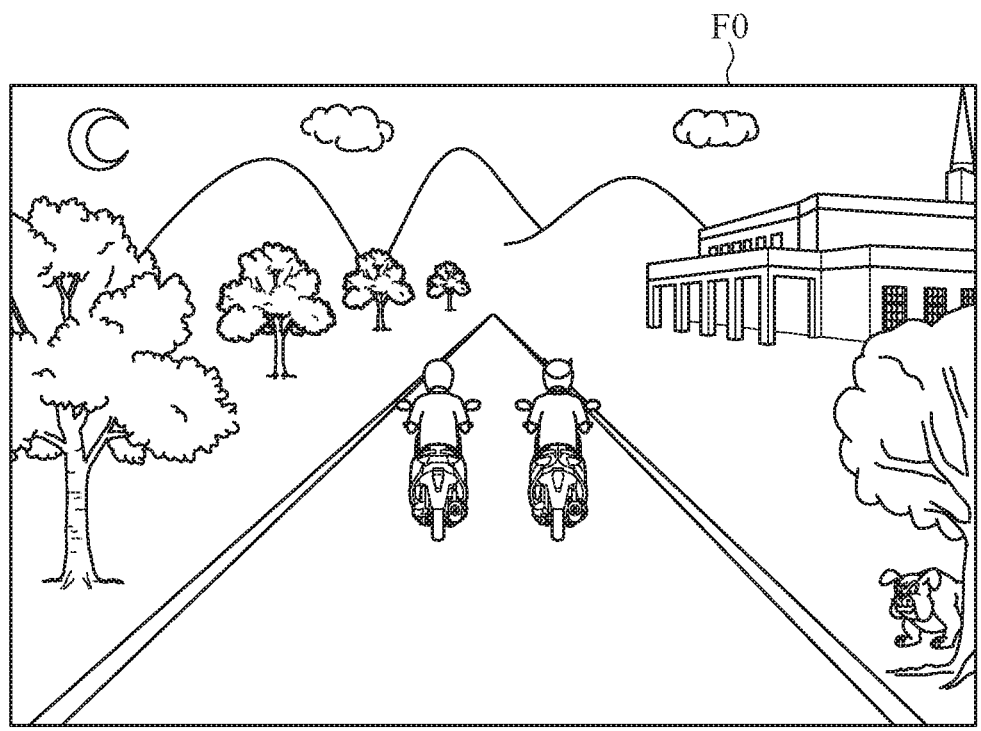
FIGS. 3 to 6 illustrate schematic views showing the image selection step of FIG. 2.

FIG. 1 illustrates a schematic view of a system for detecting object(s) adjacent to a vehicle according to an exemplary embodiment of the instant disclosure. FIG. 2 illustrates a flowchart of a method for detecting object(s) adjacent to a vehicle according to an exemplary embodiment of the instant disclosure. FIGS. 3 to 6 illustrate schematic views showing the step S30 of FIG. 2. As shown in FIG. 1, the system for detecting object(s) adjacent to a vehicle (hereinafter, the system 1) is installed in a vehicle 100, and the system 1 comprises an image capturing device 10, a memory 20, and a processor 30. The image capturing device 10 may be a camera. The memory 20 may comprise any proper volatile or non-volatile computer readable storage media. For example, the memory 60 may comprise a random access memory (RAM), a read-only memory (ROM), a universal serial bus (USB) disk (USB flash drive), a hard disk, a compact disk, a portable storage device, or other storage media or circuits. The processor 30 may be a central processing unit (CPU), a microprocessor, a control component, or hardware components/computing devices capable of executing instructions.

The processor 30 is electrically connected to the image capturing device 10 and a vehicle control bus 500 of the vehicle 100, and the processor 30 is communicationally connected to the memory 20. In this embodiment, for example, the memory 20 may be a hard disk and stores a database, but embodiments are not limited thereto. The memory 20 may be a cloud storage communicationally connected to the processor 30 via a network communication device for data accessing.

Figure 4:
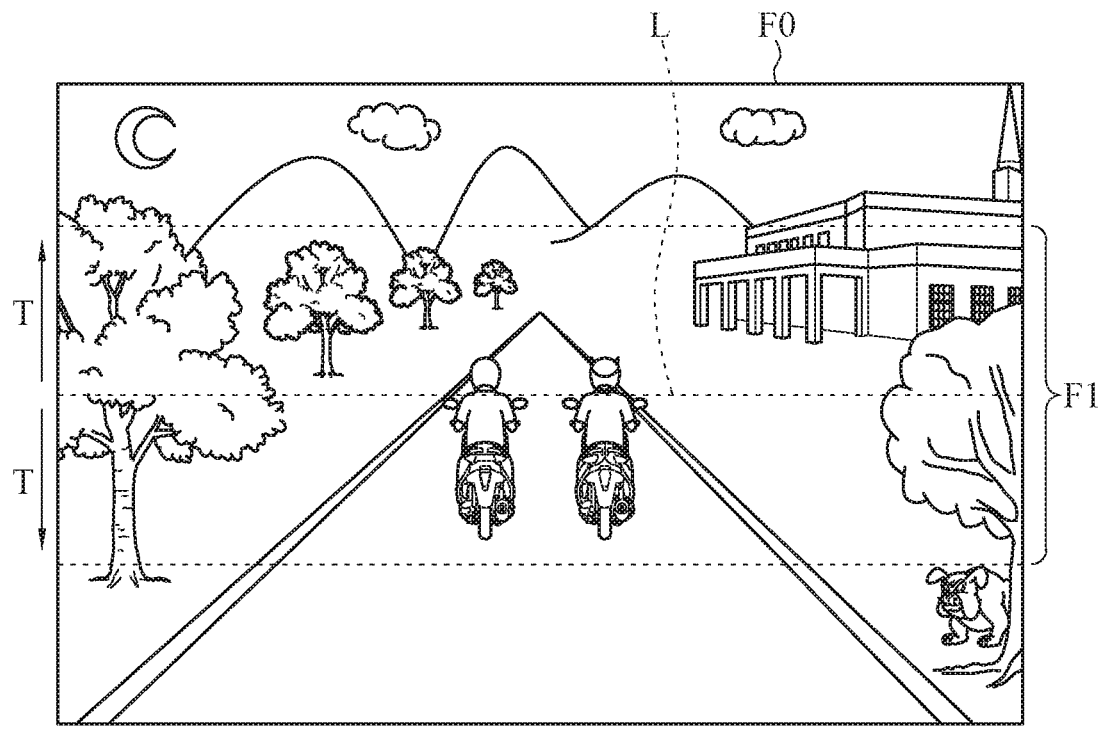
Figure 5:
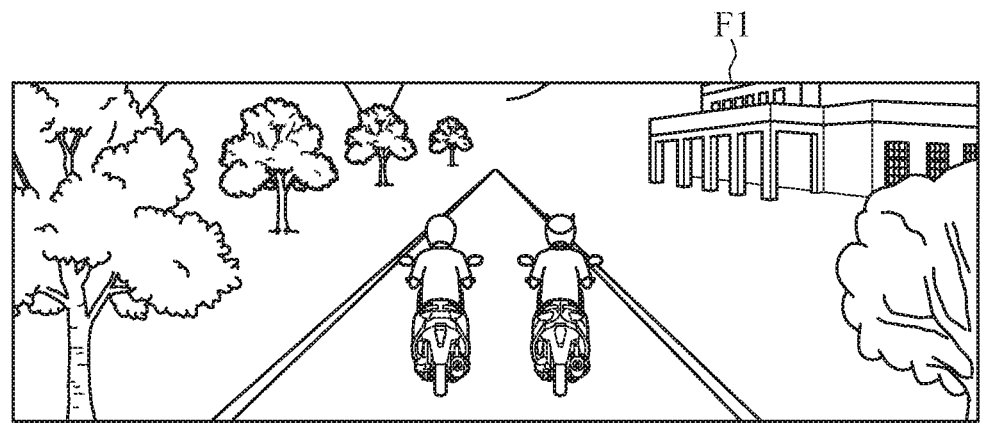

As shown in FIG. 2, a method for detecting object(s) adjacent to the vehicle (hereinafter the method S1) comprises steps S10, S20, S25, S30, S40 and S45. Please refer to FIGS. 1 to 3, in the step S10, the image capturing device 10 captures a image F0 (i.e., an image showing the object or objects adjacent to the vehicle 100). In the step S20, please refer to FIGS. 1, 2, 4, and 5, the processor 30 receives the image F0 from the image capturing device 10, determines a driving area in the image F0. In the step S25, and cut driving area of the image F0 to form an identification window F1. In this embodiment, as shown in FIGS. 4 and 5, specifically, in this embodiment, a horizontal line L in the image F0 is defined as a middle line of the driving area, and a height T is extending upwardly and downwardly from the middle line along a direction perpendicular to the middle line. However, it is understood that, the location of the driving area in this embodiment is provided as an illustrative purpose, not a limitation. Further, it is understood that the purpose for determining the driving area is to reduce the image identification area for accelerating the image identification. The driving area may be adjusted by user's setting.

Figure 6:
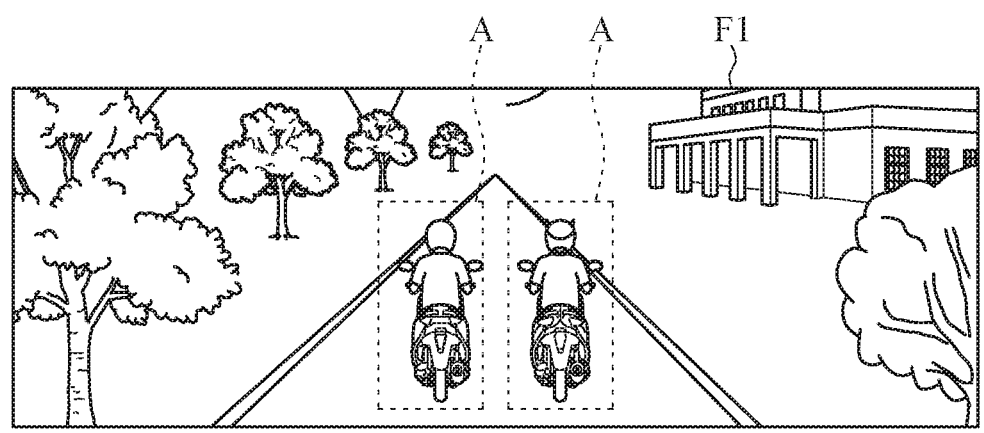

As shown in FIGS. 1, 2, and 6, in the step S30, the processor 30 selects an identification area A in the identification window F1, and the identification area A has a specific object. Specifically, in this embodiment, the selection of the identification area A is based on that if the specific object to be identified is a dynamic object. More specifically, in this embodiment, the processor 30 can access the vehicle speed of the vehicle 100 from the vehicle control bus 500 of the vehicle 100) and calculates a relative speed of specific object, with respect to the vehicle 100, so that the processor 30 can determine if the specific object is a dynamic object. In the step S40, the processor 30 accesses a plurality of object image data in the memory 20, compares the identification area A with the plurality of object image data. In the step S45, the processor 30 identifies a specific object, e.g., a pedestrian, an animal, or a two-wheeled vehicle, in the identification area A. In this embodiment, the identification window F1 may comprise one or more identification areas A, and two identification areas A are taken as an illustrative example in this embodiment, but embodiments are not limited thereto.

It is worth mentioning that, in the steps S20 to S30, the size of the identification window F1 can be shrunken or enlarged. For example, the range of the identification window F1 may be shrunken or enlarged by image pyramid techniques.

Figure 7:
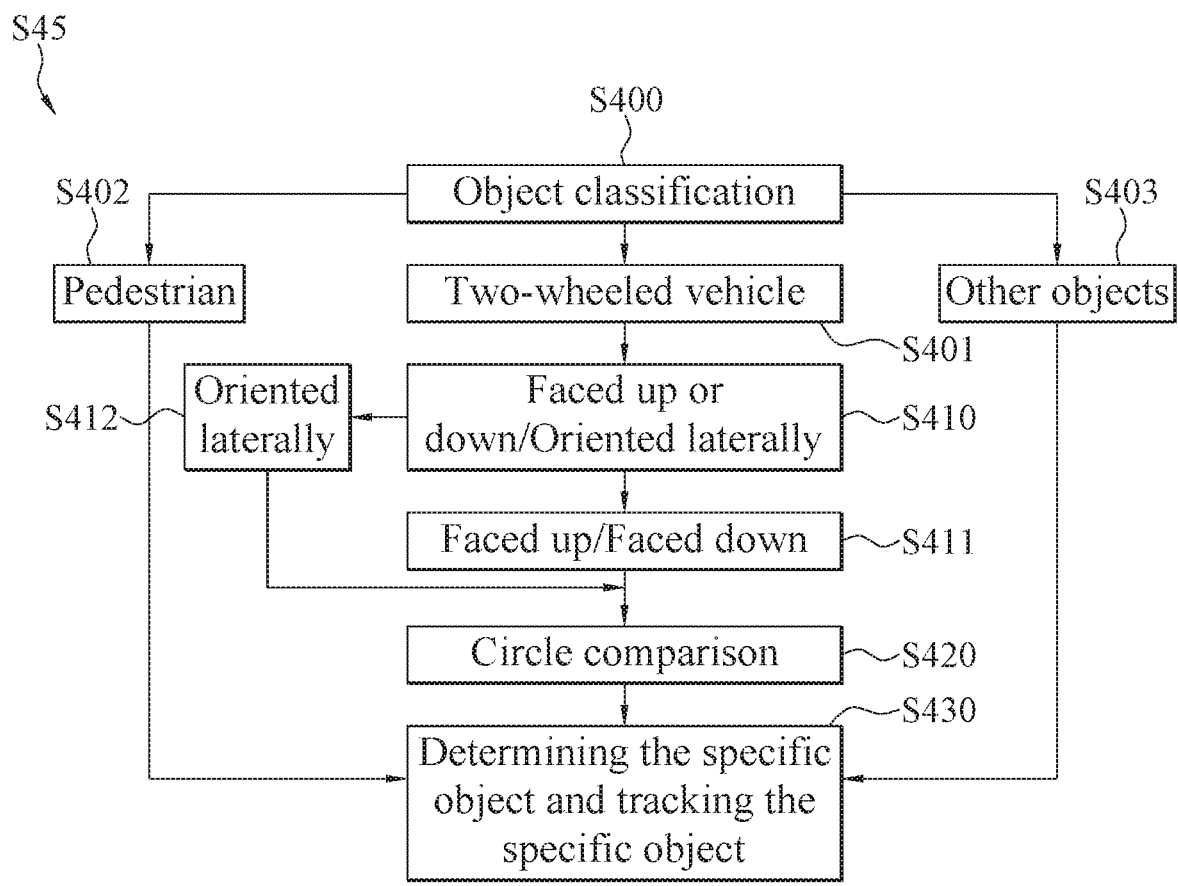
FIG. 7 illustrates a detail flowchart of the step S40 shown in FIG. 2.
Figure 8:
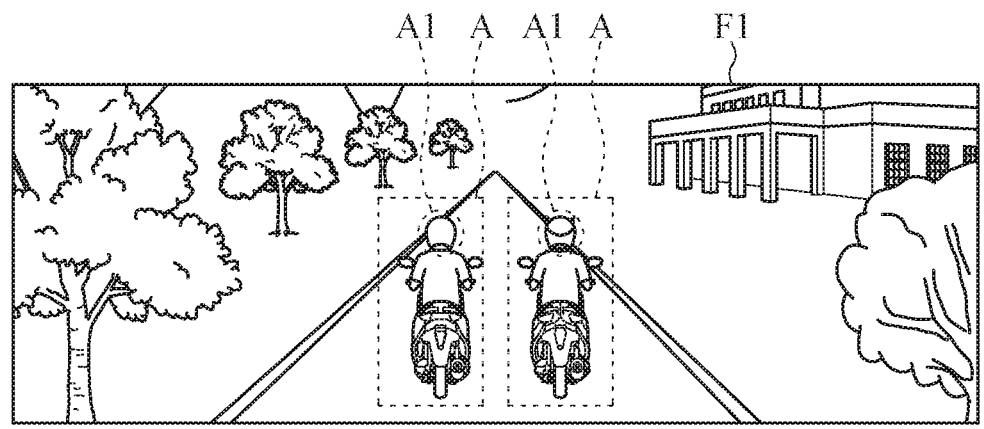
FIG. 8 illustrates a detail flowchart of the step S420 shown in FIG. 2.

FIG. 7 illustrates a detail flowchart of the step S45 shown in FIG. 2. FIG. 8 illustrates a detail flowchart of the step S420 shown in FIG. 2. FIGS. 9, 10(a), 10(b), 11(a), and 11(b) illustrate schematic views showing the image processing method using histogram of oriented gradients. As shown in FIG. 7, the step S45 may further comprise steps S400, S401, S402, S403, S410, S411, S412, S420, and S430.

Figure 9:
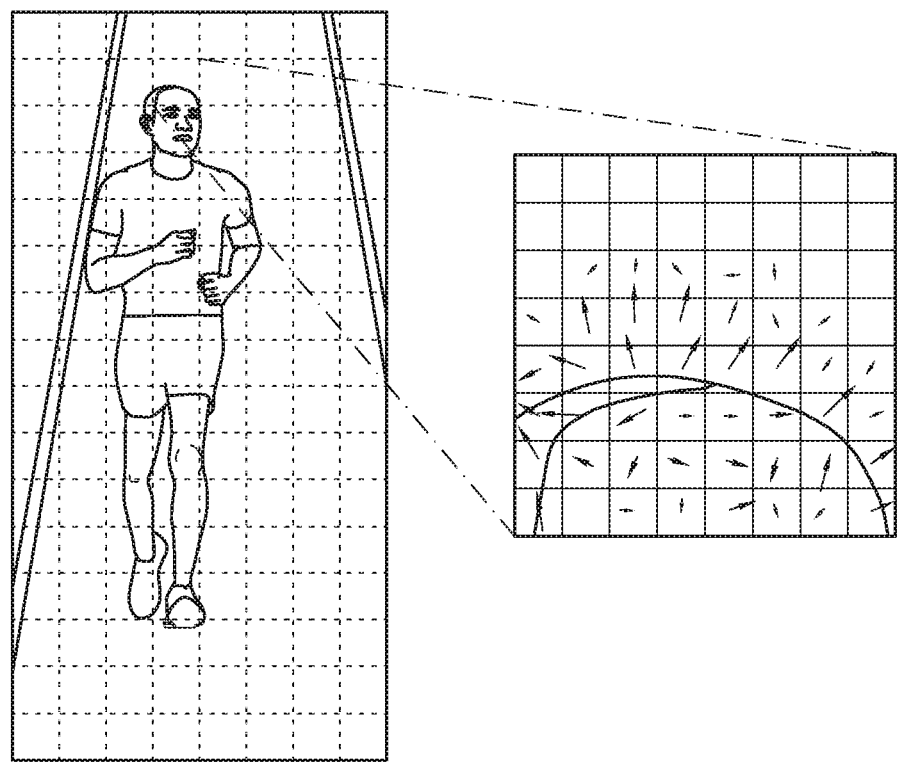
Figure 11A:
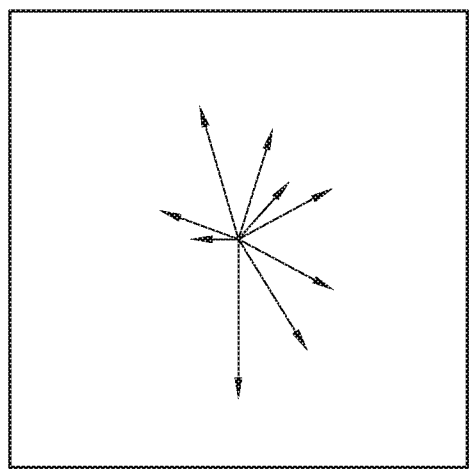

In the step S400, the processor 30 identifies the specific object in the identification area A. Further, please refer to FIGS. 9, 10(a), 10(b), 11(a), and 11(b), in this embodiment, the processor 30 determines if a specific object exists in the identification area A by an image processing method using histogram of oriented gradients (HOG). More specifically, as shown in FIG. 9, in the image processing method, the image is divided into several cells, and each cell may have an 8 pixel multiply 8 pixel (8*8) area. In FIG. 10(a), the values indicate the intensity of the gradients (grayscale value). In FIG. 10(b), the values indicate corresponding gradient angles. For each pixel, the value of the gradient intensity and the value of the gradient angle are multiplied to obtain the gradient vector value. And then, the gradient vector values are described by nine vectors (from 0 degree to 180 degrees, and 20 degree as an interval). As shown in FIG. 11(a), the gradient vectors of each of the cells are presented by vector arrows, but embodiments are not limited thereto.

Furthermore, the gradient vector may be more outstanding by using normalization or weightings, so that the main edge vector features in consecutive cells can be emphasized effectively. Accordingly, the contour of the specific object in the identification area A can be separated from the background in a more precise manner. Therefore, not only the detection rate can be improved, but also the detection accuracy can be improved. After the contour of the object is described or defined, the gradient vectors of the identification area A are compared with the gradient vectors of the plurality of object image data stored in the memory 20, so that the specific object in the identification area A is identified as a two-wheeled vehicle (step S401), a pedestrian (step S402), or other objects (step S403).

In one embodiment, a normalization calculation is provided. Firstly, four cells (i.e., an area with 16 pixel multiply 16 pixel (16*16)) is regarded as one block for calculating the gradient vectors. Next, in a manner for forming a 3*3 nine-block table, this block is taken as the center block, and the gradient vectors of other eight blocks, i.e., thirty two cells, around the center block are calculated.

Firstly, the gradient vector values of one cell is calculated by using equation 1. Equation 1: $M_0 = \sqrt{(x_{-1}-x_1)^2+(y_{-1}-y_1)^2}$, wherein $x_{-1}$ and $x_1$ respectively represent the grayscale values of the cell along the x direction, $y_{-1}$ and $y_1$ respectively represent the grayscale values of the cell along the y direction, and $M_o$ represents the intensity information of the angle. In one embodiment, there are M0~M8 representing the intensity information of total nine angles presented in the cell. Edge gradients along the x direction or the y direction can be obtained when adjacent grayscale values are subtracted. Next, length of the hypotenuse can be calculated by using Euclidean distance formula. Accordingly, the intensity information of the angle can be obtained.

Next, the intensity information of the angles can be summarized. In one embodiment, the intensity information of the angles in the thirty six cells (nine blocks) are summarized, as described in Equation 2; and the calculation is further performed according to Equation 3. Therefore, those outstanding gradient vectors in each of the blocks can be emphasized.

Equation 2: $M_{sum} = \Sigma_{j=1}^{36} (\Sigma_{i=1}^{9} M_i)_j$, wherein $M_{sum}$ indicates the summation of the intensity information of the angles, and $M_i$ indicates the intensity information of an individual angle.

$$B_i = \frac{M_i}{M_{sum}}, \quad \text{Equation 3}$$

wherein Bi indicates an intensity component of an individual angle in the cell.

Figure 11B:
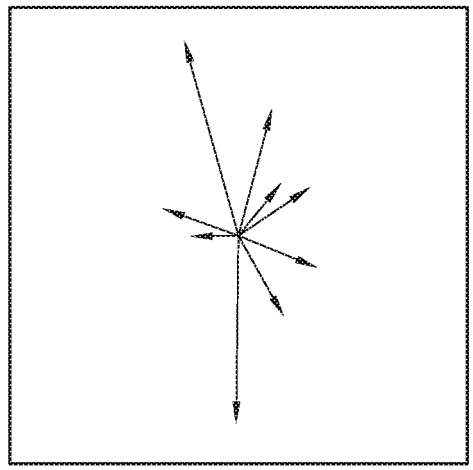

Last, as shown in Equations 4 and 5, x values after the normalization are calculated (y values can be calculated by the same approach), and the normalization of the gradient vector is performed according to Equation 5. Accordingly, outstanding gradient vectors can be emphasized in each of the cell, so that the gradient vectors represented by vector arrows as shown in FIG. 11(b) can be obtained.

$$|x| = \sqrt{B_1^2 + B_2^2 + \ldots B_n^2}, \quad \text{Equation 4}$$

$$H(x, y) = \frac{1}{|x| + 10^{-3}} * H(x_i, y), \quad \text{Equation 5}$$

wherein H(x,y) indicates the normalized gradient vector, and H(x,y) indicates the unnormalized gradient vector.

Accordingly, when the gradient vectors of each of the cells are being normalized, major vectors or vectors of consecutive edges can be figured out from surrounding blocks, and then these outstanding or important edge vectors are normalized. Hence, the major gradient vectors or consecutive gradient vectors can be more outstanding, so that the contour of the object can be distinguished from the background the identification area for further comparison and distinguishment. However, the aforementioned normalization approach is provided for illustrative purposes, not a limitation.

If the specific object is determined to be a pedestrian (i.e., entering into the step S402) or to be other object (i.e., entering into the step S403, e.g., the specific object is identified to be a cat or a dog), it is understood that, the method then enters into the step S430 due to the slower speed for these dynamic objects. Then, the processor 30 determines the specific object and tracks the specific object, so that the vehicle 100 can keep a distance from the specific object to prevent from colliding with the specific object. If the specific object is already far away from the driving area, the processor 30 stops the tracking.

If the method enters into the step S401, the processor 30 accesses the plurality of object image data stored in the memory 20 and the method enters into the step S410 to further determine if the two-wheeled vehicle shown in the image F0 is faced up, face down, or oriented laterally. When the two-wheeled vehicle is determined to have face up/face down orientations, the specific object is set to be a face-up/face-down two-wheeled vehicle. Conversely, when the two-wheeled vehicle is determined to have a lateral orientation, the specific object is set to be a lateral-oriented two-wheeled vehicle. After the step S411 and S412 end, the method both enters into the step S420.

Please refer to FIG. 8, in the step S420, when the processor 30 identifies the specific object is a two-wheeled vehicle, the processor 30 selects an upper area A1 of the identification area A to perform a circle comparison on a head of a rider on the two-wheeled vehicle, and to identify whether the head of the rider on the two-wheeled vehicle wears a helmet, or to identify the head of the rider on the two-wheeled vehicle. In this embodiment, the circle comparison can be performed by using Hough transform algorithm to detect circle images to detect if a circle object exists, but embodiments are not limited thereto. In some cases, the image F0 may have several environmental objects or the color of the helmet may be similar to the background of the image F0. Therefore, a simple contour determination may cause incorrect results, and the processor would fail to distinguish motorcycle(s) from bicycle(s). On the other hand, with the circle comparison technique, a motorcycle can be clearly distinguished a bicycle.

Furthermore, please refer to FIG. 2, in order to prevent interference due to environmental objects in the image F0 or the color of the background in the image F0, the method S1 may further comprise the step S61. In the step S61, the processor grayscales the image F0 or the identification window F1 having several environmental objects to obtain a grayscaled image or a grayscaled identification window. In other words, after the grayscaling process can be executed after the step S10 or after the step S20. In this embodiment, the image F0 or the identification window F1 can be grayscaled, and the HOG can be calculated with the grayscale values to speed up the calculation.

Moreover, please refer to FIG. 2 again, after the step S61, the method S1 further executes the step S63. In the step S63, gamma (γ) correction is applied to the grayscaled image or the grayscaled identification window by the processor 30 to obtain a corrected grayscaled image or a corrected grayscaled identification window. Accordingly, the interferences due to changes of the light intensity can be reduced, so that the HOG calculation can be speed up.

Please refer to FIGS. 1, 3 to 6, and FIG. 8, the system 1 may further comprise a display 40. The display 40 provides a mechanism for displaying data to users, and the display 40 may be a computer screen. The display 40 is electrically connected to the processor 30. When the processor 30 identifies the specific object in the identification area A, the processor 30 outputs an indication signal in respond to the specific object identified. Then, after the display 40 receives the indication signal, the method executes the step S50, and a picture is displayed on the display 40, and the picture is corresponding to the specific object at a position corresponding to the identification area A. For different objects, different pictures may be displayed on the display at a position corresponding to identification area A. Therefore, when the vehicle 100 is in the autonomous driving assistant mode, the driver can know the environmental conditions of the vehicle 100.

Furthermore, the identification results determined by the processor 30 may be sent to the cloud (not shown) through internal network of the vehicle 100 or the network of the mobile phone in the vehicle 100. The cloud may provide a second determination for the identification results, so that the cloud can update the algorithm of the processor 30 through internal network of the vehicle 100) or the network of the mobile phone in the vehicle 100. Therefore, the identification can be performed in a more accurate manner and in a shorter processing time.

The method S1 illustrated in FIG. 2 is an implementation, and can be accomplished by a computer program product comprising a plurality of instructions. The computer program product may be files transmittable on the Internet, or may be stored in a non-transitory computer readable storage medium. When the instructions in the computer program product is loaded by an electric computing device (e.g., the system 1 illustrated in FIG. 1), the computer program product executes the method for detecting object(s) adjacent to a vehicle as illustrated in FIG. 2. The non-transitory computer readable storage medium may be an electronic product. For example, the non-transitory computer readable storage medium may be a read-only memory (ROM), a flash memory, a soft disk, a hard disk, a compact disk, a flash drive, a tape, an Internet-accessible record document or other storage media.

Based on one or some embodiments of the instant disclosure, in the method and method for detecting object(s) adjacent to a vehicle, the image F0 is firstly cut to form the identification window F1, and the identification area A is selected from the identification window F1 for applying image processing algorithm for subsequent identification. Therefore, such method and system can be applied to images with different sizes, and the data volumes for computation can be greatly reduced, thereby greatly improving the calculation and identification speed. Therefore, the system and the method based on one or some embodiments of the instant disclosure are more suitable for driverless vehicles or autonomous driving assistant system.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method for detecting one or more objects adjacent to a vehicle, comprising:
   capturing, by an image capturing device, an image of an object adjacent to the vehicle;
   determining, by a processor, a driving area in the image, wherein a horizontal line of the image is a middle line of the driving area, and a height is extending upwardly and downwardly from the middle line along a direction perpendicular to the middle line;
   cutting, by the processor, the driving area to form an identification window;
   grayscaling, by the processor, the identification window to obtain a grayscaled identification window;
   applying, by the processor, gamma correction to the grayscaled identification window to obtain a corrected grayscaled identification window;
   selecting, by the processor, an identification area in the corrected grayscaled identification window;
   adjusting, by the processor, a range of the identification area by image pyramid techniques;
   accessing, by the processor, a plurality of object image data in a memory to compare the plurality of object image data with the identification area; and
   identifying, by the processor, a specific object in the identification area with an image processing method using histogram of oriented gradients in response to comparing the plurality of object image data with the identification area, wherein gradient vector generated by the histogram of oriented gradients are normalize or weighted to emphasize main edge vector features in consecutive cells.

2. The method according to claim 1, further comprising:
   generating, by the processor, an indication signal;
   transmitting, by the processor, the indication signal to a display; and
   displaying a picture corresponding to the specific object at a position corresponding to the identification area on the display.

3. The method according to claim 1, wherein the specific object is a dynamic object.

4. The method according to claim 3, further comprising:
   in respond to identifying, by the processor, the specific object is a two-wheeled vehicle, selecting, by the processor, an upper area of the identification area to perform a circle comparison on a head of a rider on the two-wheeled vehicle; and
   identifying, by the processor, whether the head of the rider on the two-wheeled vehicle wears a helmet.

5. A system for detecting one or more objects adjacent to a vehicle, installed in the vehicle, the system comprising:
   an image capturing device configured to capture an image of an object adjacent to the vehicle;
   a memory configured to store a plurality of object image data; and
   a processor electrically connected to the image capturing device, communicationally connected to the memory, and configured to:
   determine a driving area in the image, wherein a horizontal line of the image is a middle line of the driving area, and a height is extending upwardly and downwardly from the middle line along a direction perpendicular to the middle line;
   cut the driving area to form an identification window;
   grayscale the identification window to obtain a grayscaled identification window;
   apply gamma correction to the grayscaled identification window to obtain a corrected a corrected grayscaled identification window;
   select an identification area in the corrected grayscaled identification window;
   adjust a range of the identification area by image pyramid techniques;
   access the plurality of object image data in the memory to compare the plurality of object image data with the identification area; and
   identify a specific object in the identification area with an image processing method using histogram of oriented gradients in response to comparing the plurality of object image data with the identification area, wherein gradient vector generated by the histogram of oriented gradients are normalize or weighted to emphasize main edge vector features in consecutive cells.

6. The system according to claim 5, further comprising:
   a display electrically connected to the processor, wherein the processor is configured to output an indication signal in respond to the specific object identified, and the display is configured to display a picture corresponding to the specific object at a position corresponding to the identification area in respond to receiving the indication signal.

7. The system according to claim 5, wherein the specific object is a dynamic object.

8. The system according to claim 7, wherein in respond to identifying the specific object is a two-wheeled vehicle, the processor selects an upper area of the identification area to perform a circle comparison on a head of a rider on the two-wheeled vehicle, and identifies whether the head of the rider on the two-wheeled vehicle wears a helmet.

* * * * *